March 27, 1928.
Re. 16,918
L. COATALEN
BRAKE FOR VEHICLES
Original Filed Dec. 13, 1923
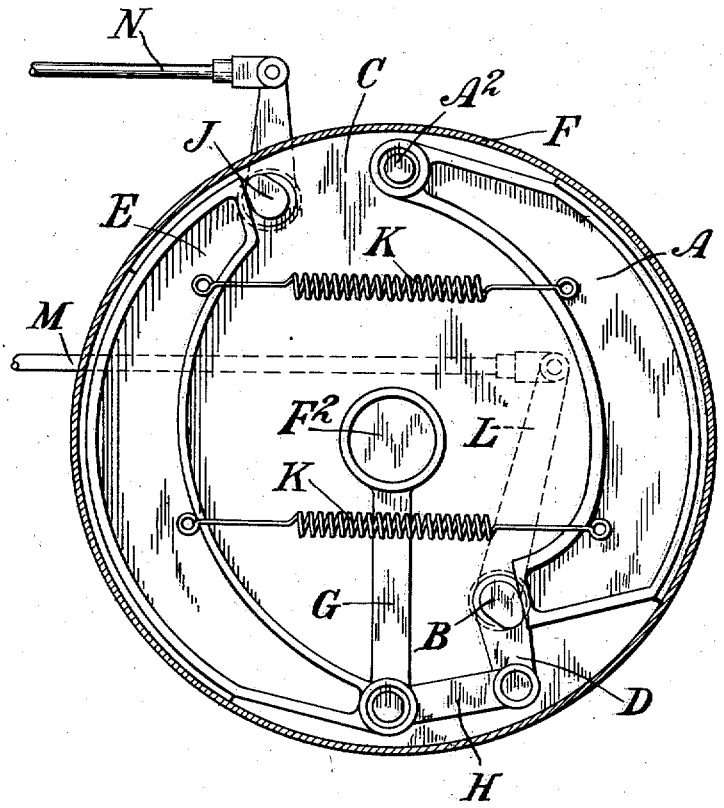
Inventor
LOUIS COATALEN
By
M. W. McConkey
Attorney Reissued Mar. 27, 1928. Re. 16,918

UNITED STATES PATENT OFFICE.

LOUIS COATALEN, OF WOLVERHAMPTON, ENGLAND, ASSIGNOR, BY MESNE ASSIGNMENTS, TO BENDIX BRAKE COMPANY, OF CHICAGO, ILLINOIS, A CORPORATION OF ILLINOIS.

BRAKE FOR VEHICLES.

Original No. 1,575,191, dated March 2, 1926, Serial No. 680,404, filed December 13, 1923. Application for reissue filed July 11, 1927. Serial No. 205,007.

This invention relates to servo-operated brakes for use on vehicles, of the kind in which two brake mechanisms are contained in a single drum, one being positively applied to the drum and being connected to the second so that movement of the first operates, servo fashion, to apply the second mechanism. Hitherto for this purpose a construction has been suggested in which the drum was engaged by two expanding bands of which the first, or servo band, was a narrow one in the center of the drum, and the end of this was connected to the end of a wide channel-shaped main band the other end of which was pivoted to a fixed point.

The object of the present invention is to provide a construction of servo brake mechanism of this kind enabling simple friction devices such as shoes or blocks to be used, one operating servo fashion, to apply the second shoe or block.

Various important features of novelty relate to the use of novel power-multiplying means connecting the shoes; to the operation of one of the shoes by the other through a linkage which preferably comprises a link pivotally mounted on the anchor or backing plate; to the use of independent emergency operating means preferably arranged to operate only one of the shoes; and to the operation of the servo shoe by means thrusting it lengthwise as well as outwardly against the drum so that the brake is reasonably effective even when the drum is rotating backwards.

The figure is a side elevation showing one embodiment of the invention.

According to the illustrated arrangement, the drum contains two segmental shoes, one on each side of the axis of the drum and located in the same radial plane, of which the first or main shoe is pivoted to a fixed point or anchor, and the second or servo shoe is free to move around the axis of the drum and is connected with the free end of the first shoe, with novel means acting upon the servo shoe to apply it to the drum.

Preferably the operative connection between the servo shoe and the main shoe is such that the latter can also readily be applied directly by control mechanism which is independent of that employed for applying the servo shoe. Thus it is possible to use the main brake in the ordinary manner to hold against motion in either direction, and it can also be used as an emergency brake in the ordinary manner.

In one method of carrying out the invention for an expanding brake, the shoe A forming the main brake is suspended or supported, as by pivoting in the usual manner at one end $A^2$, and at the other end is acted upon by means such as a cam B which is pivoted to a fixed part, such as the anchor or backing plate C, and is provided with a short lever or arm D to effect its angular movements.

The servo brake is shown as a single shoe E arranged inside the drum F opposite the main brake shoe A and supported at one end by a radius rod or radially-extending member or link G, which is angularly movable about the axis $F^2$ of the brake drum, thus allowing circumferential freedom of movement for the servo brake shoe. The end of the servo brake shoe thus supported is, by the agency of a link H, operatively connected to the lever D of the cam acting upon the main brake, the disposition of the parts being such that when the servo brake shoe E is applied to the drum F its circumferential movement due to the movement of the drum acts to apply the main brake A through the parts H and D. The above-described parts comprise a novel linkage connecting the shoes and also serving (through member G) to support the connected end of shoe E.

The servo brake shoe E is acted upon by means such as a cam J at the end remote from its suspension means so as to bring it into engagement with the brake drum, and this cam as usual may be actuated from the usual brake pedal. Cam J thrusts shoe E lengthwise as well as outwardly against the drum, so that the brake is applied with a fair degree of effectiveness even when the vehicle is moving backward,—i. e. when the drum F is turning clockwise. The two shoes may be connected to one another as usual by pull-off springs K so that their arrangement in this respect broadly resembles that of an ordinary expanding brake. Cam B serves as a stop co-operating with springs K to determine the idle position of shoe A.

An important feature of the invention is the provision of means for operating the main brake shoe A quite independently of the servo brake. To effect this in a simple manner the cam B which acts directly upon the shoe A is operatively connected to the side or hand brake lever as by the arm L and rod M through some form of joint which may embody a flexible or sliding connection adapted to permit of the movement of the cam under the operation of the servo brake quite independently of the additional mechanism provided to operate it independently of the servo brake.

It will be seen from the foregoing that the servo and the main brake are effectively combined together in a simple and direct manner, involving a minimum of space occupied, and virtually no parts other than would be required for an ordinary expanding or contracting brake.

What I claim as my invention and desire to secure by Letters Patent of the United States is:—

1. In a brake for a vehicle, the combination of a drum, a main segmental shoe inside said drum, a servo segmental shoe also inside said drum and on the opposite side of the axis of said drum, a fixed pivot for one end of said main shoe, an operative connection between the other end of said main shoe and the adjacent end of said servo shoe, including a lever and a cam operated thereby, said cam engaging said main shoe.

2. In a brake for a vehicle, the combination of a drum, a main segmental shoe inside said drum, a servo segmental shoe inside said drum, a servo segmental shoe inside said drum and on the opposite side of the axis thereof from said main shoe, a fixed pivot for one end of said main shoe, an operative connection between the other end of said main shoe and the adjacent end of said servo shoe, including a lever and a cam operated thereby, said cam engaging said main shoe, and means for directly applying the main shoe to the drum in addition to its application through the connection with the servo shoe, substantially as set forth.

3. In a brake for a vehicle, the combination of a drum, a main segmental shoe inside said drum, a servo segmental shoe inside said drum and on the opposite side of the axis thereof from said main shoe, a fixed pivot for one end of said main shoe, an operative connection between the other end of said main shoe and the adjacent end of said servo shoe, including a lever and a cam operated thereby, said cam engaging said main shoe, and a link from the lever to the servo shoe, substantially as set forth.

4. In a brake for a vehicle, the combination of a drum, a main segmental shoe inside said drum, a servo segmental shoe also inside said drum and on the opposite side of the axis of said drum, a fixed pivot in one end of said main shoe, an operative connection between the other end of said main shoe and the adjacent end of said servo shoe, means for applying the servo shoe to the interior of said drum, said operative connection between the shoes comprising a pivoted cam engaging the main shoe, a lever on the cam, and a link from the lever to the servo shoe, and means for actuating the cam directly as well as from the servo shoe, substantially as set forth.

5. In a brake for a vehicle, the combination of a drum, a main segmental shoe inside said drum, a servo segmental shoe also inside said drum and on the opposite side of the axis of said drum, a fixed pivot in one end of said main shoe, an operative connection between the other end of said main shoe and the adjacent end of said servo shoe, means for applying the servo shoe to the interior of said drum, means for directly applying the main shoe to the drum in addition to its application through the connection with the servo shoe, a radius rod G free to swing about the axis of the drum, said servo shoe being pivoted to said radius rod, substantially as set forth.

6. A brake comprising, in combination, a drum, a supporting part adjacent the drum, shoes within the drum, and movable means between the shoes and through which one shoe acts on the other and including a swinging member pivoted on said part and positively pivoted to one of said shoes.

7. A brake comprising, in combination, a drum, a supporting part adjacent the drum, shoes within the drum, and movable means supporting at least one of the shoes comprising a radially-extending swinging link pivoted on said part and pivotally connected to the end of said shoe.

8. A brake comprising, in combination, a drum, a supporting part adjacent the drum, a shoe within the drum, applying means acting on one end of said shoe, and a swinging member pivoted on said part at one end and directly pivoted to the other end of said shoe at its other end.

9. A brake comprising, in combination, a drum, a supporting part adjacent the drum, shoes within the drum, applying means at one side of the drum, and movable means acting on the shoes at the other side of the drum and comprising a radially-extending swinging link pivoted on said part at one end and directly pivoted at least to one of the shoes at its other end.

10. A brake comprising, in combination, a drum, a supporting part adjacent the drum, shoes within the drum, and movable means adjacent the ends of the shoes and through which one shoe acts on the other and including a swinging member pivoted on said part at one end and pivoted to one shoe at its other end, together with a part pivoted to said member and acting to apply the other shoe and actuated by the first shoe.

11. Friction means for a brake comprising at least one shoe having a radially-extending link pivoted to one of its ends, in combination with applying means acting on the other end of said shoe.

12. Friction means for a brake comprising at least one rigid shoe having a pivotally-mounted member pivoted to one of its ends, in combination with applying means acting on the other end of said shoe.

13. A brake including a drum and an anchored and an unanchored shoe arranged end to end within the drum and connected by power-multiplying means through which the unanchored shoe acts on the anchored shoe, in combination with applying means thrusting the unanchored shoe lengthwise as well as outwardly against the drum.

14. A brake including a drum and an anchored and an unanchored shoe arranged end to end within the drum and connected by power-multiplying means through which the unanchored shoe acts on the anchored shoe, in combination with an applying device engaging the free end of the unanchored shoe and thrusting the unanchored shoe lengthwise as well as outwardly against the drum.

15. A brake comprising, in combination, a drum, friction means engageable with the drum and including shoes arranged end to end, applying means acting directly on one shoe and indirectly on another shoe through said one shoe, and auxiliary applying means for forcing one of said shoes against the drum independently of the other.

16. A brake comprising, in combination, a drum, friction means engageable with a single zone of the drum, applying means acting on all of said friction means, and auxiliary applying means acting on a part only of said friction means.

17. A brake comprising, in combination, a drum, shoes arranged end to end within the drum, a linkage connecting said shoes, applying means acting directly on one shoe and through said linkage on the other shoe, and auxiliary applying means acting through said linkage on said other shoe independently of said one shoe.

18. A brake comprising, in combination, a drum, shoes arranged end to end within the drum, power-multiplying means connecting said shoes, applying means acting directly on one shoe and through said power-multiplying means on the other shoe, and auxiliary applying means acting through said means on said other shoe independently of said one shoe.

19. A brake comprising, in combination, an anchored shoe, an unanchored shoe arranged at the unanchored end of the anchored shoe, applying means acting on said unanchored shoe and through said unanchored shoe on the anchored shoe, and auxiliary applying means acting on the anchored shoe independently of the unanchored shoe.

20. In a braking apparatus, the combination of a rotary drum, a floating shoe for engagement therewith, a non-rotary mounting support, means for mounting said shoe to partake of limited movement with the drum comprising a link pivotally connected at one end to one end of the shoe and at the other end to the support substantially on a radial line from the axis of the drum passing through said connection with the shoe, means for forcing the shoe into engagement with the drum, a second shoe adapted to engage the drum, and means actuated by the rotary movement of the floating shoe for applying the second shoe.

21. A brake comprising, in combination, a drum, a pair of shoes arranged end to end and engageable with the same zone of the surface of the drum, and power-multiplying means engaging adjacent ends of the shoes and operated by one of the shoes to apply the other shoe.

22. A brake comprising, in combination, a drum, a plurality of shoes arranged end to end and engageable with the drum, and power-multiplying lever means pivotally connected to one end of one of the shoes and operated by movement thereof to apply the other shoe.

23. A brake comprising, in combination, a drum, main and servo shoes engageable with the drum, and a member mounted for angular movement about the axis of the drum and pivotally connected to the servo shoe and swung about said axis by the servo shoe, said servo shoe forcing the main shoe against the drum.

24. A brake comprising, in combination, a drum, main and servo shoes engageable with the drum, and a member mounted for angular movement about the axis of the drum and pivotally connected to one end of the servo shoe.

25. A brake comprising, in combination, a rotatable drum, a pair of friction devices arranged end to end and engageable with the same zone of the surface of the drum, and a lever pivoted for movement about an axis between the axis of the drum and the circumference of the drum and which is rocked about said axis by one of the friction devices in such a manner as to force against the drum the other friction device, the lever being connected to one of the friction devices by a connecting link.

26. A brake comprising, in combination, a rotatable drum, main and servo shoes arranged end to end and engageable with the same zone of the surface of the drum, and a lever pivoted for angular movement about an axis between the axis of the drum and the circumference of the drum and positively connected to one of the shoes and which is rocked by movement of the servo shoe to force the main shoe against the drum.

27. A brake comprising, in combination, a rotatable drum, main and servo shoes arranged within the drum and engageable with the same zone of the surface of the drum, and a lever pivoted for angular movement about an axis between the axis of the drum and the circumference of the drum and the end of which is connected to the end of the servo shoe and which is arranged to force the main shoe against the drum.

28. A brake comprising, in combination, a rotatable drum, a main shoe anchored at one end and engageable with the drum, a servo shoe arranged end to end with respect to the anchored shoe and engageable with the same zone of the surface of the drum, and a lever arranged for angular movement about an axis between the axis of the drum and the circumference of the drum and connected to one end of the servo shoe and which is arranged to force the anchored shoe against the drum.

29. A brake comprising, in combination, a rotatable drum, an anchored shoe and a servo shoe arranged end to end to engage the same zone of the drum, a cam arranged at the unanchored end of the anchored shoe to force the anchored shoe against the drum, a lever for rocking the cam extending generally radially outward of the drum, and means pivotally connecting the end of the lever to the end of said servo shoe.

30. A brake comprising, in combination, a rotatable drum having a cylindrical braking surface, a shoe anchored at one end within said surface, a servo shoe also engageable with said surface, a cam arranged at the unanchored end of the anchored shoe to force the anchored shoe against the drum, a lever for rocking the cam extending generally radially outward of the drum, and means pivotally connecting the end of the lever to the adjacent end of the servo shoe.

31. A brake comprising, in combination, a rotatable drum having a cylindrical braking surface, an anchored shoe engageable with said surface, a lever arranged to force the anchored shoe against the drum, a servo shoe also engageable with said surface, and a connecting link pivoted at its ends to the end of the lever and to the servo shoe.

32. A brake comprising, in combination, a rotatable drum having a cylindrical braking surface, an anchored shoe engageable with said surface, a lever arranged to force the anchored shoe against the drum, a servo shoe also engageable with said surface, and a connecting link pivoted at its ends to the adjacent end of the servo shoe and to the lever.

In testimony whereof, I have hereunto signed my name at Wolverhampton, England, this 18th day of October, 1927.

LOUIS COATALEN.